May 29, 1934.     S. G. DOWN     1,960,332
BRAKE RELEASE DEVICE
Filed Oct. 9, 1931
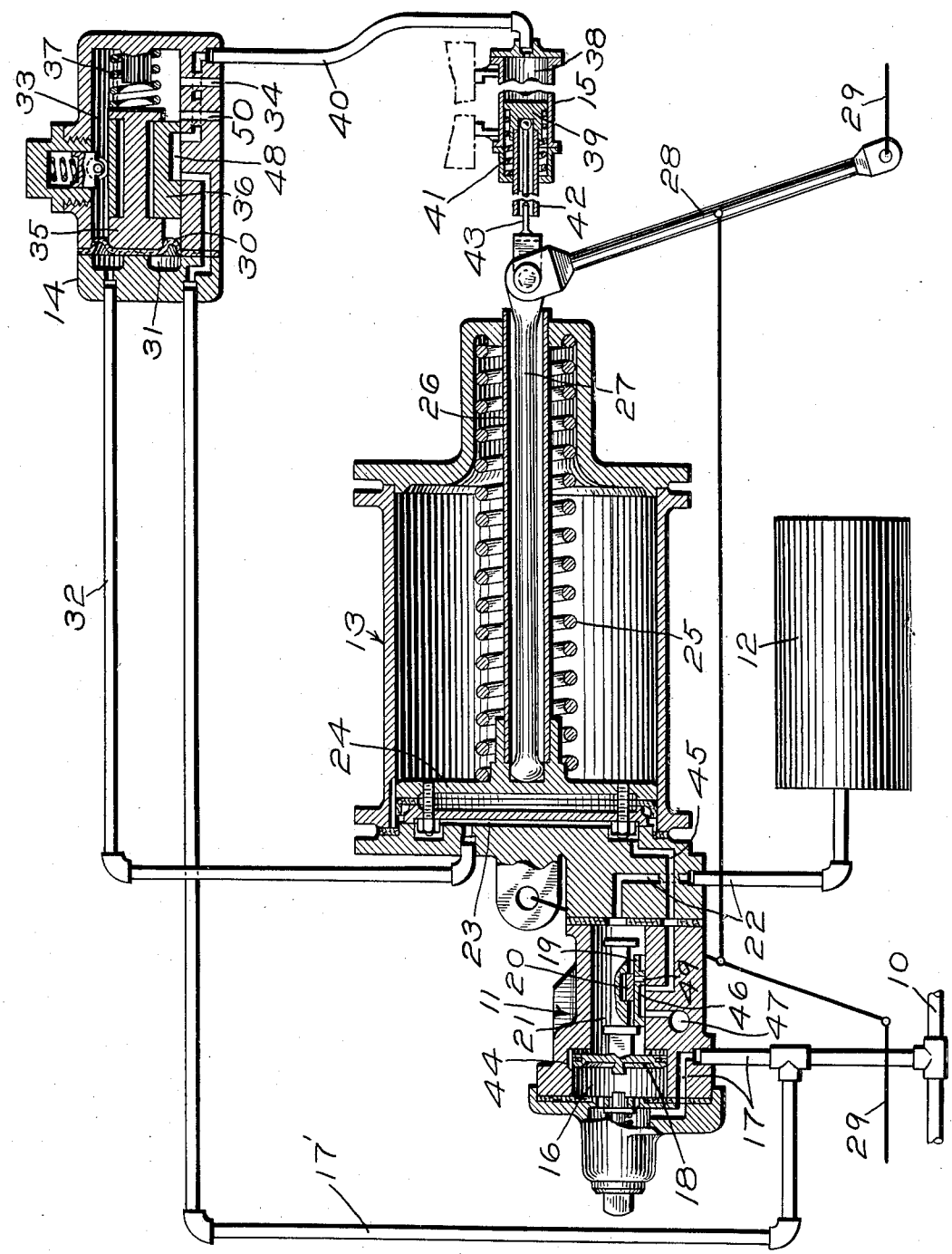
INVENTOR.
SIDNEY G. DOWN
BY
*Wm. M. Cady*
ATTORNEY.

Patented May 29, 1934

1,960,332

UNITED STATES PATENT OFFICE 1,960,332

BRAKE RELEASE DEVICE

Sidney G. Down, Edgewood, Pa., assignor to The Westinghouse Air Brake Company, Wilmerding, Pa., a corporation of Pennsylvania Application October 9, 1931, Serial No. 567,838

8 Claims. (Cl. 303—68)

This invention relates to fluid pressure brakes and more particularly to fluid pressure actuated means for assisting in the movement of the usual brake rigging to its release position and for normally maintaining it in release position.

A conventional method for maintaining the brake rigging in release position employs mechanical means in the form of release springs. The use of release springs in this connection has not proved to be entirely satisfactory, due principally to objectionable characteristics of the springs. The most objectionable feature lies in the fact that long continued use invariably results in the weakening of the effect of the spring or in its complete fatigue; either of these conditions causes improper release of the brakes and results in a detrimental dragging of the brake shoes on the wheels.

An object of the present invention is the provision of improved means for effecting a positive withdrawal of the brake shoes from the wheels and normally retaining them in release position.

Another object of the invention resides in the provision of improved fluid pressure means controlled by brake pipe pressure for effecting a movement of the brake rigging to release position.

A further object of the invention lies in the provision of improved fluid pressure actuated means adapted to be effective in moving the brake rigging to and retaining it in its release position, and which will be ineffective when the associated fluid pressure actuated mechanism is rendered active to effect the application of the brakes in the usual manner.

Other objects and advantages will appear from the following description of an illustrative embodiment of the present invention.

In the drawing, the single figure is a diagrammatic view, mainly in section, of a fluid pressure brake equipment, shown in release position, and embodying the brake release device of the present invention.

As shown in the accompanying drawing, the brake equipment may comprise a brake pipe 10, a triple valve device 11, an auxiliary reservoir 12, a brake cylinder 13, a release valve device 14 and a release cylinder 15.

The triple valve device 11 may comprise a casing having a piston chamber 16 which is connected to the brake pipe through a pipe and passage 17 and which contains a piston 18 adapted to operate a main slide valve 19 and an auxiliary slide valve 20 contained in a chamber 21 which is in open communication with the auxiliary reservoir 12 through a passage and pipe 22.

The brake cylinder 13 contains a pressure chamber 23 within which a piston 24 is slidably mounted. The piston 24 is subject on one side to fluid under pressure supplied to the chamber 23, and subject on the other side to the pressure of a coil spring 25. A hollow piston rod 26 is secured to the spring side of the piston 24 and extends outwardly through an opening in the non-pressure head of the brake cylinder. A push rod 27 is loosely mounted in the hollow piston rod 26. The inner end of the push rod 27 is adapted to operatively engage the piston 24 when fluid under pressure is supplied to the chamber 23 to effect an application of the brakes. A brake lever 28 is pivotally mounted on the outer end of the push rod 27 and the usual foundation brake rigging, including pull rods 29, is connected to the brake lever 28 in the usual manner. Since the push rod 27 is loosely mounted in the hollow piston rod 26, it will be seen that manual application of the brakes may readily be effected without imparting any movement of the piston 24.

The release valve device 14 may comprise a casing having a flexible diaphragm 30 having at one side, a fluid chamber 31 which is in open communication at all times through a pipe 32 with the piston chamber 23 in the brake cylinder 13. At the other side of the diaphragm 30, is a valve chamber 33 which is open to the atmosphere through a passage 34 formed in the valve casing. Movement of the flexible diaphragm 30 under the influence of fluid pressure in the chamber 31 controls the operation of a follower member 35 having a slide valve 36 operatively connected therewith. A spring 37 is interposed between the valve casing and the follower 35 and serves as a means for retaining the follower in contact with the diaphragm 30.

The release cylinder 15 may comprise a casing adapted to be secured to any suitable fixed support, and having a piston chamber 38 containing a piston 39, which is subject on one side to fluid under pressure supplied to the piston chamber 38 through a pipe and passage 40 which leads to the seat of the valve 36 in the control valve device 14; the other side of the piston is subject to the pressure of a coil spring 41. A hollow piston rod 42 is secured to the spring side of the piston 39 and extends outwardly through an opening in the non-pressure head of the release cylinder 15. A push rod 43 is loosely mounted in the hollow piston rod 42 in a manner identical with that described in conjunction with the brake cylinder push rod 27. The outer end of the push rod 43 is pivotally connected to the brake lever 28 on the same fulcrum utilized for mounting the outer end of the push rod 27.

With the several parts of the brake equipment in release position, as shown in the accompanying drawing, the auxiliary reservoir 12 is maintained charged with fluid under pressure from the brake pipe 10 by way of pipe and passage 17, triple valve piston chamber 16, feed groove 44 around the piston 18, slide valve chamber 21 and passage and pipe 22.

With the triple valve device 11 in release position, the brake cylinder chamber 23 is vented to the atmosphere by way of a passage 45, a cavity 46 formed in the main slide valve 19 of the triple valve device, and the passage 47. Since the chamber 31 in the release valve device 14 is in open communication through pipe 32 with the brake cylinder chamber it will also be vented to the atmosphere.

The pressure of the spring 37 maintains the follower member 35 and slide valve 36 in their extreme left hand positions, so that fluid supplied under pressure to the brake pipe will charge the piston chamber 38 in the release cylinder 15 through a branch pipe 17' and passage in the release valve casing, a cavity 48 in the slide valve 36 and passage and pipe 40. With the piston chamber 38 charged with fluid under brake pipe 10 pressure, the piston 39 will be moved to the left against the spring 41 and thus maintain the brake cylinder lever 28 and the associated elements of the foundation brake rigging in release position.

To effect an application of the brakes, the brake pipe pressure is reduced in the usual manner, and upon such reduction the triple valve piston 18 will move to the left from its release position, under the fluid pressure in the valve chamber 21. The leftward movement of the piston 18 causes the auxiliary slide valve to move relative to the main slide valve 19, and by such movement the end of the auxiliary slide valve 20 will uncover a service port 49 in the main slide valve 19. Continued outward movement of the piston 18 will carry the main slide valve to application position, in which the service port 49 registers with the brake cylinder passage 45, so that fluid under pressure is supplied to the brake cylinder chamber 23 from the slide valve chamber 21 and auxiliary reservoir 12 through port 49 and passage 45.

From the brake cylinder piston chamber 23, fluid under pressure is supplied to the diaphragm chamber 31 through pipe 32. When the pressure of fluid in chamber 31 is sufficient to overcome the pressure of coil spring 37, the diaphragm will be flexed to the right, shifting follower member 35 and the slide valve 36 to their extreme right hand position. With the slide valve 36 in this position, the cavity 48 establishes communication from the pipe and passage 40 to a passage 50 which is open to the atmosphere. With the chamber 38 thus vented, the pressure of spring 41 causes the piston 39 to move, relative to the push rod 43, to its extreme right hand position.

As fluid pressure is built up in the brake cylinder piston chamber 23, the piston 24 is moved outwardly against the pressure of spring 25. The outward movement of the piston 24 causes the push rod 27 to be moved outwardly and imparts movement to the brake lever 28 and the associated foundation brake rigging 29 to effect a brake application by forcing the brake shoes into frictional engagement with the wheels of the vehicle.

To release the brakes, the brake pipe pressure is increased in the usual manner, causing the piston 18 of the triple valve device 11 to move to the right and move the slide valves 19 and 20 to release position, in which position fluid under pressure in the brake cylinder piston chamber 23 is permitted to flow to the atmosphere through passage 45, cavity 46 in the slide valve 19, and passage 47. As pressure in the brake cylinder piston chamber 23 reduces, the pressure of the spring 25 causes the piston 24 to move toward the left relative to the push rod 27, and when the piston 24 is substantially in its release position, the pressure of fluid in the diaphragm chamber 31 of the release valve device 14 has been reduced sufficiently by a flow of fluid from the chamber 31 through pipe 32 and piston chamber 23 to permit the spring 37 to overcome the pressure in chamber 31 and move the follower 35 and slide valve 36 to the position shown in the drawing.

With the triple valve device 11 and release valve device 14 in their respective release positions, fluid under pressure is supplied from the brake pipe 10 to recharge the auxiliary reservoir in the usual manner and to charge the release cylinder piston chamber 38 through pipe 17', cavity 48 in the slide valve 36 and pipe and passage 40. The supply of fluid under pressure to the chamber 38 causes the piston 39 to be moved to the left against the pressure of spring 41. The leftward movement of the piston 39 moves the push rod 43 and causes the brake cylinder lever 28 to be rocked about its fulcrum to move the push rod 27 into abutting relation with the piston 24 and to return the brake rigging 29 to its normal release position. It will readily be seen that the brake rigging 29 is positively retained in release position by the fluid pressure maintained in the release cylinder piston chamber 38, which pressure is not destroyed until such time as a brake application is initiated.

From the foregoing description it will be seen that a brake release device has been provided, in a fluid pressure brake system, which is operative under brake pipe pressure to effect a positive release of the brakes and retain the brake rigging in release position without impairing or resisting in any manner the normal operation of effecting the usual prompt application of the brakes.

While the invention has been described in considerable detail in the foregoing specification, it is understood that various changes may be made in its embodiment without departing from or sacrificing any of the advantages hereinafter claimed.

Having now described my invention, what I claim as new and desire to secure by Letters Patent, is:

1. In a fluid pressure brake system, the combination with a brake pipe, a brake cylinder, and a brake member operable by fluid supplied to said brake cylinder, of a brake controlling valve device operated upon variations in brake pipe pressure to effect the supply and release of fluid to and from the brake cylinder, fluid pressure operated means for moving said member to release position, and means operated upon the release of fluid from the brake cylinder for supplying fluid from the brake pipe to said fluid pressure operated means.

2. In a fluid pressure brake system, the combination with a brake pipe, a brake cylinder, and a brake member operable by fluid supplied to the brake cylinder, of a brake controlling valve device operated by variations in brake pipe pressure to control the pressure in the brake cylinder, and a fluid pressure means normally subject to brake pipe pressure for normally maintaining said brake member in release position, and valve means operated by fluid supplied to the brake cylinder for rendering said fluid pressure means ineffective to maintain said brake member in release position.

3. In a fluid pressure brake system, the combination with a brake pipe, a brake cylinder, and a brake member operated by fluid pressure supplied to said brake cylinder, of a brake controlling valve device operated by variations in brake pipe pressure to control the fluid pressure in the brake cylinder, a fluid pressure operated means normally subject to brake pipe pressures for normally maintaining said brake member in release position, and valve means operated by fluid pressure supplied to the brake cylinder to vent the fluid pressure from said fluid pressure operated means for rendering said means ineffective to maintain said member in release position.

4. In a fluid pressure brake system, the combination with a brake operating mechanism, of a brake pipe, a triple valve device, an auxiliary reservoir, a brake cylinder, a piston in said brake cylinder, means operated by said piston for effecting movement of said brake operating mechanism to apply the brakes, a release valve device, a release cylinder, a piston in said release cylinder, means operated by said last named piston for moving said brake operating mechanism to effect a release of the brakes, said release valve device being subject at all times to fluid pressure in said brake cylinder and being operable at one time for supplying said release cylinder with fluid under brake pipe pressure for retaining said brake operating mechanism in release position and at another time for venting fluid under pressure from said release cylinder to render the same ineffective upon the supply of fluid from said auxiliary reservoir to said brake cylinder to effect movement of said brake operating mechanism to apply the brakes.

5. In a fluid pressure brake system, the combination with a brake pipe and brake operating mechanism, of a brake cylinder device operative by fluid under pressure to apply braking power to said mechanism and operative upon release of fluid pressure therefrom for relieving said mechanism of braking power, a release cylinder device operative by fluid under brake pipe pressure for normally retaining said mechanism in release position, and valve means under the control of fluid pressure in said brake cylinder device for rendering said release cylinder ineffective to influence the operation of said brake device in effecting an application of the brakes.

6. In a fluid pressure brake system, the combination with a brake pipe and a brake operating mechanism, a brake cylinder, a triple valve device operative upon a reduction in brake pipe pressure for supplying fluid under pressure to said brake cylinder to move said brake operating mechanism to effect an application of the brakes, a release cylinder charged with fluid at brake pipe pressure for normally retaining said brake operating mechanism in release position, and valve means operative upon an increase in brake cylinder pressure for venting said release cylinder to render it ineffective in retaining said brake operating mechanism in release position.

7. In a fluid pressure brake, the combination with a brake pipe, a brake cylinder, and a brake controlling valve device operated by variations in brake pipe pressure for controlling the pressure in said cylinder, of a brake member operable by fluid supplied to said brake cylinder, and means operated by said brake pipe pressure for urging said member toward release position.

8. In a fluid pressure brake, the combination with a brake pipe, a brake cylinder, and a brake controlling valve device operated by variations in brake pipe pressure for controlling the pressure in said cylinder, of a brake member operable by fluid supplied to said brake cylinder, a device operated by brake pipe pressure for urging said member toward release position, and means controlled by brake cylinder pressure for controlling communication through which fluid is supplied from said brake pipe to said device.

SIDNEY G. DOWN.